(12) United States Patent
Webb et al.

(10) Patent No.: US 6,960,326 B1
(45) Date of Patent: Nov. 1, 2005

(54) METHOD OF SEPARATING URANIUM FROM IRRADIATED NUCLEAR FUEL

(75) Inventors: Kevin James Webb, Seascale (GB); Eric George Hope, Leicester (GB)

(73) Assignee: British Nuclear Fuels PLC, Warrington (GB)

( * ) Notice: Subject to any disclaimer, the term of this patent is extended or adjusted under 35 U.S.C. 154(b) by 320 days.

(21) Appl. No.: 10/130,906

(22) PCT Filed: Nov. 22, 2000

(86) PCT No.: PCT/GB00/04434

§ 371 (c)(1),
(2), (4) Date: Sep. 3, 2002

(87) PCT Pub. No.: WO01/39209

PCT Pub. Date: May 31, 2001

(30) Foreign Application Priority Data

Nov. 27, 1999 (GB) .................................... 9928035

(51) Int. Cl.$^7$ ............................................ C01G 56/00
(52) U.S. Cl. ............................ 423/3; 423/4; 423/258; 423/259; 376/308; 976/DIG. 280
(58) Field of Search ................................ 423/258, 259, 423/3, 4; 376/308; 976/DIG. 280

(56) References Cited

U.S. PATENT DOCUMENTS

| | | | | |
|---|---|---|---|---|
| 3,012,849 A | * | 12/1961 | Horn | 423/4 |
| 3,145,078 A | * | 8/1964 | Strickland et al. | 423/4 |
| 3,832,439 A | | 8/1974 | Carter, Jr. | |
| 4,212,686 A | * | 7/1980 | Lunde et al. | 420/422 |

FOREIGN PATENT DOCUMENTS

| | | |
|---|---|---|
| FR | 1588220 | 4/1970 |
| GB | 981044 | 1/1965 |

* cited by examiner

Primary Examiner—Steven Bos
(74) Attorney, Agent, or Firm—Howard & Howard

(57) ABSTRACT

The invention provides a method of separating uranium from at least fission products in irradiated nuclear fuel, said method comprising reacting said irradiated nuclear fuel with a solution of ammonium fluoride in hydrogen fluoride fluorinating said reacted irradiated nuclear fuel to form a volatile uranium fluoride compound and separating said volatile uranium fluoride compound from involatile fission products. The invention thus provides a reprocessing scheme for irradiated nuclear fuel. The method is also capable of reacting, and breaking down Zircaloy cladding and stainless steel assembly components. Thus, whole fuel elements may be dissolved as one thereby simplifying procedures over conventional Purex processes.

8 Claims, 7 Drawing Sheets

METHOD OF SEPARATING URANIUM FROM IRRADIATED NUCLEAR FUEL

BACKGROUND OF THE INVENTION

1. Technical Field

The present invention relates to a method of separating uranium from at least fission products in irradiated nuclear fuel.

2. Related Art

For many years the preferred method of reprocessing irradiated nuclear fuel has been the established Purex process. The Purex process includes an initial stage or 'head-end' in which the fuel rods first are cut into shorter lengths and then are exposed to hot nitric acid which leaches out the irradiated nuclear fuel from inside the ZIRCALOY (tradename) cladding. ZIRCALOY is a trademark designating a family of zirconium alloys containing tin and zirconium. The unreacted ZIRCALOY cladding is collected and disposed of as Medium Activity (MA) waste. After the 'head-end' is an extraction stage, in which the nitric acid solution which contains the uranium and plutonium as well as fission products is subjected to a solvent extraction cycle to separate the uranium and plutonium from the fission products. In subsequent stages the uranium and plutonium are separated and purified.

It remains desirable to improve aspects of the Purex process. For example, it would be advantageous to simplify the cutting and dissolution steps in the 'head-end'. It would also be desirable to reduce the volume of acid and solvent used and thereby the volume of waste generated.

The present invention aims to overcome these problems by way of an alternative method to the Purex process.

A reprocessing method has been disclosed some time ago in U.S. Pat. No. 3,012,849 and U.S. Pat. No. 3,145,078 comprising converting the uranium and zirconium in the irradiated fuel and cladding respectively to uranium and zirconium fluoride complexes and then separating the uranium complex. In that method the fluoride complexes are formed by reaction of the fuel and cladding with a mixture of HF and either NOF or metal fluoride (denoted MF). However, when NOF is used, large volumes of $NO_x$ is produced and when MF is used large volumes of solid waste are generated. Also, the method could be improved in terms of overall separation efficiency.

Previously, in Synth. React. Inorg. Met-Org. Chem. 26 (1996) 139, ammonium bifluoride has been proposed to treat ZIRCALOY to convert it to a convenient storage form as part of a nuclear waste storage scheme. Also previously, in Chem. Eng. Prog. 50 (1954) 230, ammonium bifluoride has been used in a process for fabricating uranium metal nuclear fuel.

DD 301,016 discloses use of aqueous solutions of HF and/or ammonium fluoride and nitric acid for etching to achieving a corrosion resistant layer on the surface of fuel elements. U.S. Pat. No. 3.832,439 discloses use of an aqueous solution of ammonium fluoride for dissolving zirconium cladding.

SUMMARY OF THE INVENTION

According to the present invention there is provided a method of separating uranium from at least fission products in irradiated nuclear fuel, said method comprising reacting said irradiated nuclear fuel with a solution of ammonium fluoride in hydrogen fluoride, fluorinating said reacted irradiated nuclear fuel to form a volatile uranium fluoride compound and separating said volatile uranium fluoride compound from involatile fission products.

The solution of ammonium fluoride in hydrogen fluoride, further details of which are given below, will hereinafter be designated as $NH_4F/HF$.

The present invention is also capable of reacting, and breaking down ZIRCALOY cladding and stainless steel assembly components. Thus, the cutting steps as used in the conventional Purex process may be simplified or may not be required in the present invention. Accordingly, in one embodiment, the invention also provides a way of dissolving the whole fuel element (fuel, cladding and assembly components such as stainless steel grids and structural components of the elements) thereby providing a simplified 'head-end'. There has not been any previous suggestion of using ammonium bifluoride in an irradiated nuclear fuel reprocessing method to break down both the irradiated fuel and the ZIRCALOY cladding.

The $NH_4F/HF$ solution is capable of being readily recycled by an evaporation-condensation process. Thus the total volume of the solution consumed can be much less than the volumes of acid and solvent consumed in Purex methods, leading to lower volumes of waste being generated.

The $NH_4F/HF$ is produced by dissolution of ammonium fluoride, $NH_4F$, in anhydrous hydrogen fluoride, HF. It is believed that the $NH_4F$ reacts with the HF in solution to form the so-called bifluoride ion $HF_2^-$. However, the precise identity of the fluorinating species is not known with certainty and so the foregoing description of how $NH_4F$ behaves in HF should be understood as not limiting the invention in any way. The chemical species in the HF may be written either as $NH_4F.HF$ or $NH_4.HF_2$.

The reaction of the irradiated nuclear fuel, ZIRCALOY or stainless steel with the $NH_4F/HF$ may be enhanced by the presence of elemental fluorine, $F_2$, dissolved in the $NH_4F/HF$ solution. It has been found that the higher the fluorine pressure, the higher the dissolution rate of the irradiated fuel, ZIRCALOY and stainless steel.

The most saturated solution of ammonium fluoride is preferred. At room temperature, the solubility limit is 326 g of ammonium fluoride per liter of HF.

Elevated temperatures may be used. If the temperature increases above room temperature, the HF begins to boil off. If the concentration of the ammonium fluoride exceeds the solubility limit at a given temperature, a solid complex initially forms which may be written as $NH_4F.HF$ or $NH_4.HF_2$ or may be termed ammonium bifluoride.

At sufficiently elevated temperatures, the HF may boil off to leave molten $NH_4F.HF$ or $NH_4.nHF$ complexes.

Where a temperature is used such that the HF is substantially boiled off, references herein to reaction of the irradiated fuel, ZIRCALOY or stainless steel with the solution of ammonium fluoride in HF shall be understood to be references to reaction with the molten $NH_4F.HF$.

$NH_4F.HF$ melts at around 125° C. and boils at around 239°. Pressurisation may enable higher temperatures to be used with molten $NH_4F.HF$.

The dissolution rates of the irradiated fuel and ZIRCALOY increase with increasing temperature up to the boiling point of the $NH_4F.HF$.

Reactions of uranium dioxide, $UO_2$, ZIRCALOY and stainless steel with the $NH_4F/HF$ may be summarised by equations (1)–(3) below respectively, however no limitation on the invention should be inferred from the equations which are merely the believed mechanisms.

$$UO_2+NH_4F+4HF \rightarrow NH_4UF_5+2H_2O \quad (1)$$

$$Zr+2NH_4F+4HF \rightarrow (NH_4)_2ZrF_6+2H_2 \quad (2)$$

$$Fe+3NH_4+3HF \rightarrow (NH_4)_3FeF_6+3/2H_2 \quad (3)$$

It should be noted that if the amount of HF is limited or the reagent is $NH_4F.HF$ then $NH_3$ will be produced in reactions (1) and (2) as there will be insufficient HF to complex it. The $UO_2$, ZIRCALOY and stainless are all capable of being broken down at room temperature using the present invention. The uranium, zirconium and iron reaction products in (1) and (2) are solids.

Where fluorine, $F_2$ is dissolved in the $NH_4F/HF$, the overall reaction taking place may be slightly different, as for example in equation (4).

$$Zr + 2NH_4F + 2F_2 \xrightarrow{HF} (NH_4)_2ZrF_6 \quad (4)$$

After reaction with the $NH_4F/HF$, the reacted irradiated fuel, ZIRCALOY, stainless steel solid products indicated in equations (1)–(3) may be separated from the $NH_4F/HF$ solution. The separation maybe effected by filtering the solid products or by evaporation of the $NH_4F/HF$ solution.

The reacted irradiated fuel, ZIRCALOY and stainless steel are then fluorinated so that the uranium forms a volatile uranium fluoride. The volatile uranium fluoride is then separated from involatile forms of fission products, zirconium and iron. Preferably the volatile uranium fluoride is uranium hexafluoride.

If the separated volatile uranium fluoride gas contains one or more impurities such as a volatile plutonium fluoride, it may be purified in known ways if desired.

THE DRAWINGS

These and other features and advantages of the present invention will become more readily appreciated when considered in connection with the following detailed description and appended drawings, wherein.

DETAILED DESCRIPTION

Figure 1:
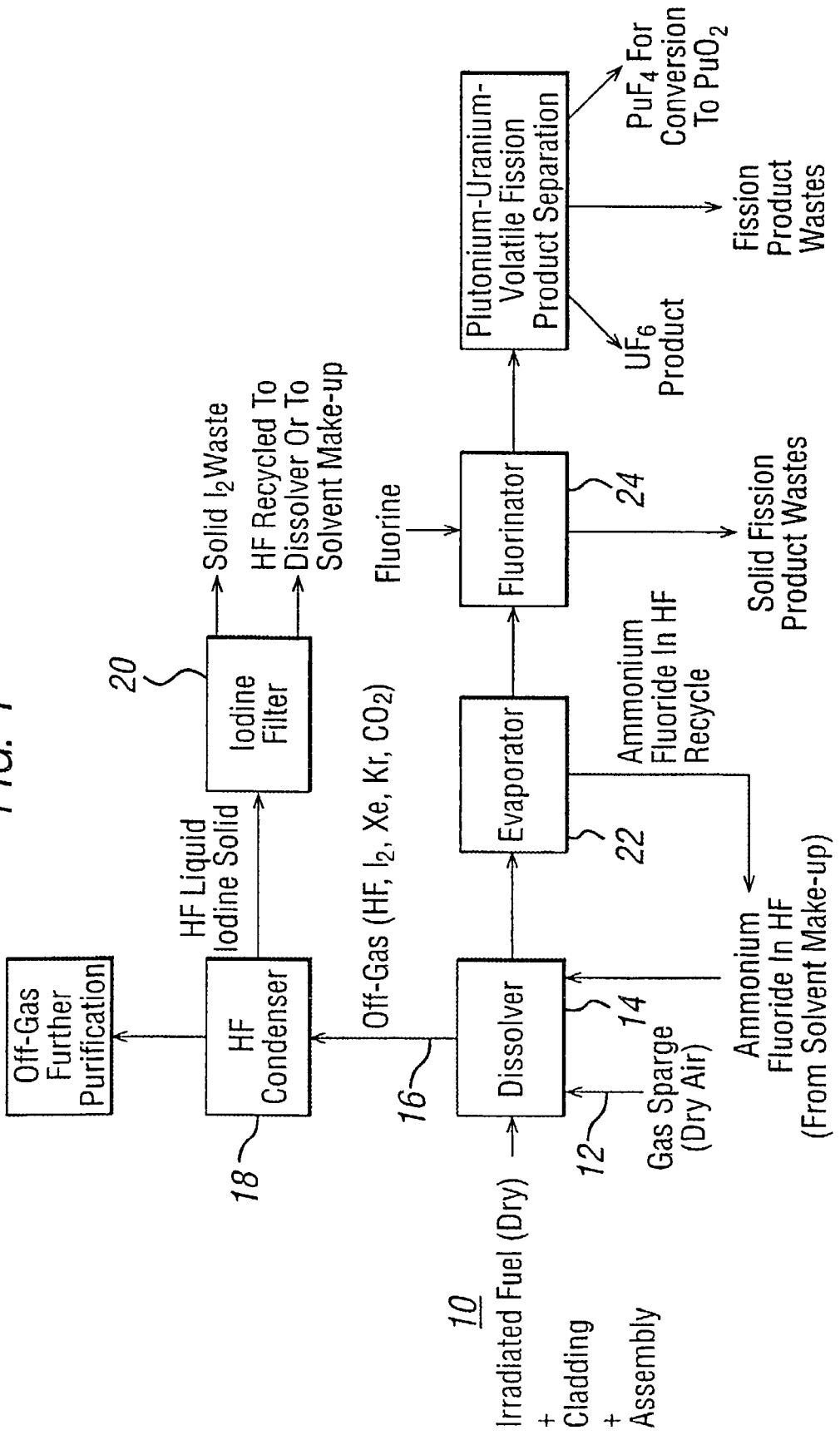
FIG. 1 shows a flow chart of the steps of the reprocessing method.

To further illustrate the invention, an example of a reprocessing method comprising the present invention will now be described with reference to FIG. 1 which shows a flow chart of the steps in the reprocessing method. The example is not limiting on the scope of the invention.

The irradiated fuel 10 together with any fuel cladding and/or fuel assembly components is broken down by reaction with the $NH_4F/HF$ in a Dissolver 14. A gas sparge 12, which typically may be dry air, is passed through the Dissolver 14 to prevent the build up of gases such as HF, $H_2$, $I_2$, Xe, Kr, $CO_2$ The gas sparge 12 may cause considerable HF loss which may require more HF to be added to keep the solvent mobile. The off-gas 16 passes through a Condenser 18 to condense the HF and trap the $I_2$ as solid iodine. The iodine is then filtered from the HF by an Iodine filter 20 and the HF is recycled to the Dissolver 14. If fluorine is used in the fuel dissolution then iodine will form complex iodine fluoride compounds and this will probably result in the iodine remaining in solution during dissolution.

The solid reacted irradiated fuel, ZIRCALOY and stainless steel in the Dissolver 14 is then separated from the $NH_4F/HF$ solution in the Evaporator 22. In the Evaporator 22, the solution is heated to a temperature of the order of 240° C. to remove the HF and $NH_4F$ and leave the solid product comprising reacted irradiated fuel, ZIRCALOY and stainless steel. Lower temperatures could be used under vacuum. The evaporated $NH_4F/HF$ may be recycled back to the Dissolver 14.

As an alternative to the evaporation step it may be possible to filter the uranium reaction product, and possibly the plutonium reaction product, directly from the reaction solution and hence provide a quicker way of separating it from the solution than evaporation and there would also be some purification from "soluble" elements, such as strontium and caesium. The solution could be cycled straight back into the reactor after addition of fresh ammonium fluoride. However, repeated recycling would eventually result in a build up of fission products in the solvent and so some solvent would have to be periodically drawn off for purification (purification involves evaporation and condensation). Notably, if the plutonium product is soluble in solution while the uranium product is mostly insoluble (plutonium is normally present in much smaller amounts than uranium) then an immediate uranium-plutonium separation would be possible (direct recycling of solvent would not be used in this case as this would lead to a build up of plutonium and eventually to the precipitation of plutonium).

The solid product is then fluorinated in the Fluorinator 24 by thermally reacting the solid product with fluorine gas. Flame fluorination is a preferred method. It may be necessary to heat the solid before fluorination to 500° C. to convert the uranium to uranium tetrafluoride to make it easier to fluorinate. The $NH_3$ and $NH_4F$ evolved by the conversion to uranium tetrafluoride may be recycled back into the solvent stream. The fluorination produces a volatile fluoride of uranium, $UF_6$, together with minor amounts of volatile products of plutonium and fission products. The $UF_6$ is separated from any other volatile products by known means, e.g. laser separation. The bulk of the fission products remain after the fluorination step as an involatile solid which is treated as waste. Depending on the further uses for the uranium, it may be converted to $UO_2$ e.g. by known routed such as reaction of $UF_6$ with water-hydrogen at high temperature.

Examples illustrating the effectiveness of the present invention will now be described.

GENERAL PROCEDURE FOR EXAMPLES 1–7

The reactions were carried out in a reactor comprising a closed fluorinated ethylene polymer (FEP) tube which was shaken except for the reactions at high concentrations of $NH_4F/HF$ or when heating above room temperature or when using pressures exceeding Ca.6 atmospheres.

A sample of ZIRCALOY or uranium dioxide as appropriate and the ammonium fluoride were loaded into the reactor and anhydrous HF was then admitted to the reactor. In Examples 1 to 3 where fluorine was also added, a specific pressure of $F_2$ was admitted at the beginning of the reaction.

In order to determine the rate of dissolution of the material, the reactor was agitated for 6 hours before the unreacted fuel material was separated (cold filtration with anhydrous hydrogen fluoride washing) and then weighed.

Example 1

Variation of the $NH_4F$: ZIRCALOY Molar Ratio

A series of experiments were performed in which either unoxidised or oxidised ZIRCALOY were allowed to react in a variety of molar ratios with ammonium fluoride. The 'oxidised' material is a simulation of material present after exposure to the extreme conditions inside a nuclear reactor.

Figure 2:
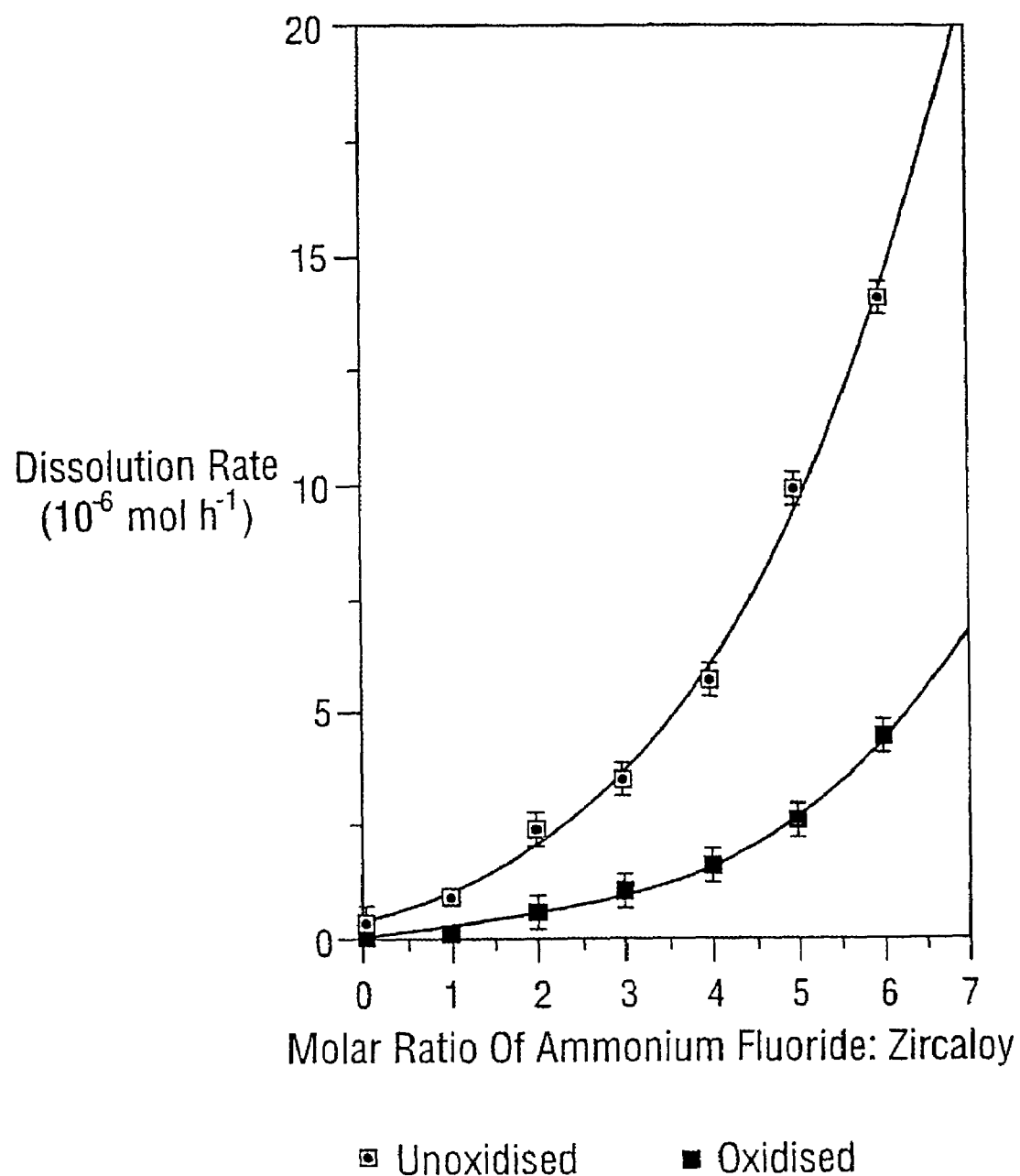
FIG. 2 shows a plot of dissolution rate vs. mole rates of ammonium fluoride: ZIRCALOY.

The reaction of the ZIRCALOY was independent of the $NH_4F$ concentration. A series of experiments were carried out to establish whether any variation in rate associated with changes in the $NH_4F$: ZIRCALOY molar ratio was actually a concentration effect. In these reactions, $NH_4F$ and ZIRCALOY were reacted in a x:y ratio solvated in either 5 or 10 cm$^3$ of anhydrous HF (AHF) under 2.86 atmospheres of fluorine gas. In both sets of experiments, the rates of ZIRCALOY dissolution were identical indicating that the variation in rate is associated with the relative molar ratios and is not associated with a variation in the concentration of $NH_4F$ in solution. However, the variation in the molar ratio of $NH_4F$: ZIRCALOY in a constant volume of AHF yielded different dissolution rates. FIG. 2 shows the dissolution rates from the experiments performed with increasing molar ratios of $NH_4F$: ZIRCALOY (experiments performed at 2.86 atm $F_2$). The plot shows that the dissolution rate is approximately quadratically dependent, therefore, increasing the amount of $NH_4F$ to a maximum, based on the maximum solubility in AHF (32.6 g in 100 g AHF) at room temperature, will afford data on the maximum attainable dissolution rate under these conditions. The maximum measured rate of dissolution for unoxidised and oxidised ZIRCALOY under these conditions was 14.07×10$^{-6}$ mol hr$^{-1}$ and 4.39×10$^{-6}$ mol hr$^{-1}$, which corresponds to 1.284 mg hr$^{-1}$ and 0.400 mg hr$^{-1}$ respectively, both were at 6:1 molar ratio $NH_4F$: ZIRCALOY, and 2.86 atm $F_2$ pressure. The dissolution rate for the oxidised ZIRCALOY is 3.2 times slower than that for the unoxidised ZIRCALOY.

Example 2

Variation of $F_2$ Pressure

Figure 3:
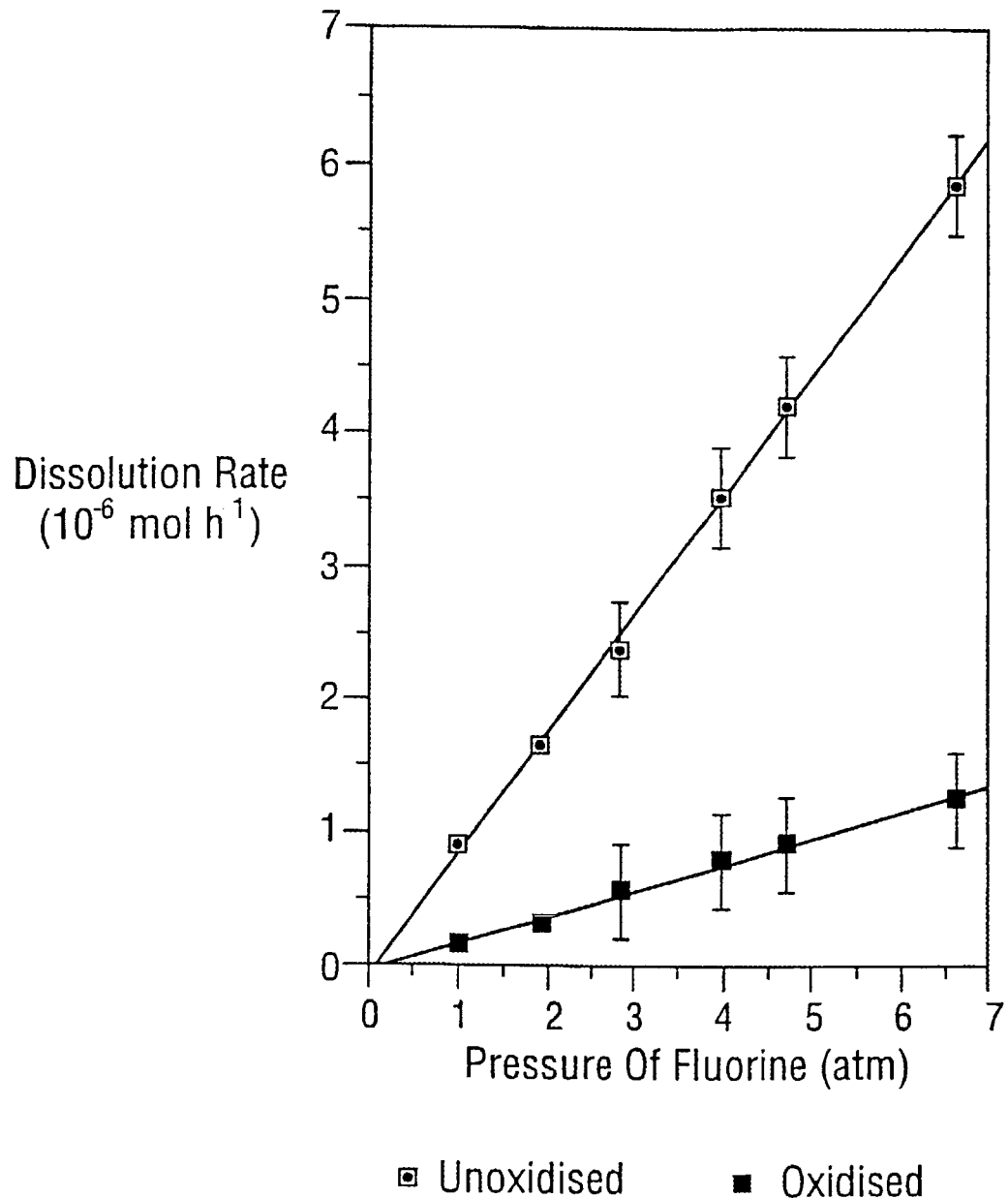
FIG. 3 shows a plot of dissolution rate vs. pressure of fluorine.

A series of experiments investigating the effect on dissolution rate of the variation of $F_2$ were performed. FIG. 3 shows the results, which indicate that the dissolution rate is linearly dependent on $F_2$ pressure. However, this interpretation of the results does not take into account the effective $F_2$ concentration in solution or the fact that the partial pressure of fluorine above the solution will decrease as the reaction proceeds. The maximum measured rate of dissolution for unoxidised and oxidised ZIRCALOY under these conditions was 5.80×10−6 mol hr$^{-1}$ and 1.09×10$^{-6}$ mol hr$^{-1}$ which corresponds to 0.53 mg hr$^{-1}$ and 0.01 mg hr$^{-1}$ respectively, at 6.63 atm $F_2$ pressure and a 2:1 molar ratio of $NH_4F$: ZIRCALOY. The rate of dissolution of oxidised ZIRCALOY was again slower than that for the unoxidised ZIRCALOY, approximately 5.2 times.

An idea of the attainable dissolution rates can be obtained if the two maximum measured dissolution rate are considered together to calculate the maximum attainable dissolution rates based on these results. This maybe done by calculating the amount by which the rate increased upon increase in $F_2$ pressure and applying it to the maximum rate obtained by varying the $NH_4F$: ZIRCALOY molar ratios.

| Unoxidised ZIRCALOY: | |
|---|---|
| Rate at 2.86 atm $F_2$ | = 2.38 × 10$^{-6}$ mol hr$^{-1}$ |
| Rate at 6.63 atm $F_2$ | = 5.85 × 10$^{-6}$ mol hr$^{-1}$ |
| therefore, the relative increase in rate | = 5.85/2.38 = 2.46 |
| therefore, calculated dissolution rate at 6.63 atm $F_2$ pressure and 6:1 molar ratio of $NH_4F$:Zircaloy | = 14.07 × 10$^{-6}$ × 2.45 mol hr$^{-1}$ = 3.46 × 10$^{-5}$ mol hr$^{-1}$ |
| corresponds to | = 3.16 mg hr$^{-1}$ |

If the same calculation is applied to the data obtained for the oxidised ZIRCALOY the calculated current maximum dissolution rate at 6.63 atm $F_2$ pressure and 6:1 molar ratio of $NH_4F$: ZIRCALOY is 8.69×10$^{-6}$ mol hr$^{-1}$ which corresponds to 0.79 mg hr$^{-1}$.

Example 3

Variation of the $NH_4F$: Uranium Dioxide Molar Ratio

A series of experiments on the reaction of uranium dioxide with $NH_4F/F_2$/AHF were performed, where the molar ratios of $NH_4F$: $UO_2$ were varied. As was seen in the reaction of ZIRCALOY in Example 1, the reaction of uranium dioxide with $NH_4F$, is also independent of the concentration of $NH_4F$. An identical procedure to that used for Example 1 for ZIRCALOY was applied to uranium dioxide.

Figure 4:
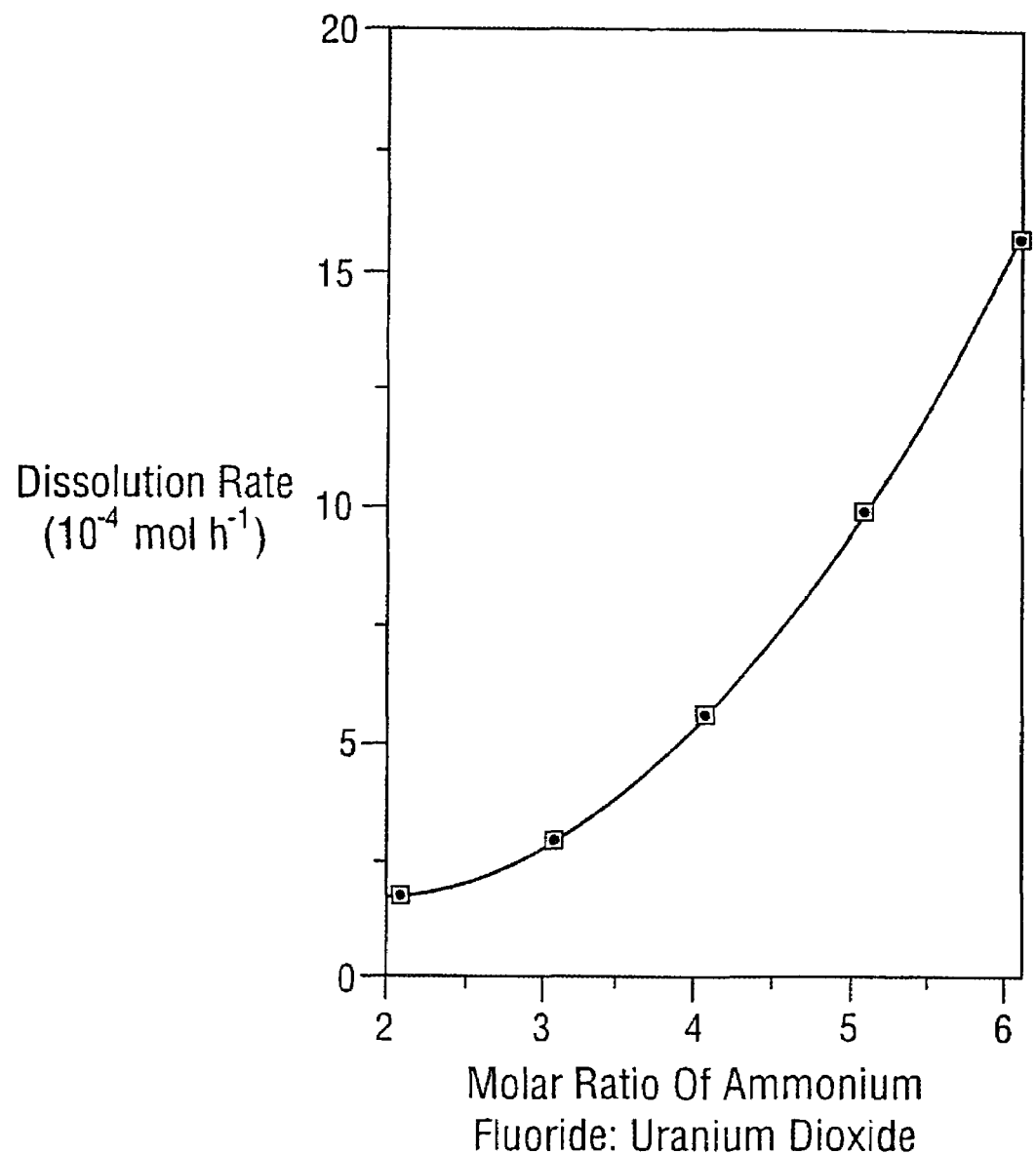
FIG. 4 shows a plot of dissolution rate vs. molar ratio of ammonium fluoride: uranium dioxide.

FIG. 4 shows the dissolution rates of $UO_2$ in the experiments performed with increasing molar ratios of $NH_4F$: $UO_2$. The plot shows that the dissolution rate is approximately quadratically dependent on the molar ratio of $NH_4F$: $UO_2$, as observed for ZIRCALOY. The maximum measured rate of dissolution achieved for $UO_2$ under these conditions was 1.567×10$^{-4}$ mol hr$^{-1}$, which corresponds to 42.32 mg hr$^{-1}$, at a 6:1 molar ratio $NH_4F$: $UO_2$, and 2.86 atm $F_2$ pressure.

As was expected the uranium dioxide reacted considerably faster than ZIRCALOY with $NH_4F/F_2$/AHF. However, on an industrial scale, in the case where the fuel rods are not cut up, once the slow decladding has occurred, the uranium dioxide would be exposed and then react rapidly. From this work, even under moderate conditions, the reactivity of $UO_2$ is approximately over 100 times greater than both forms of ZIRCALOY.

Example 4

Variation of $NH_4F$ concentration in AHF without $F_2$

Figure 5:
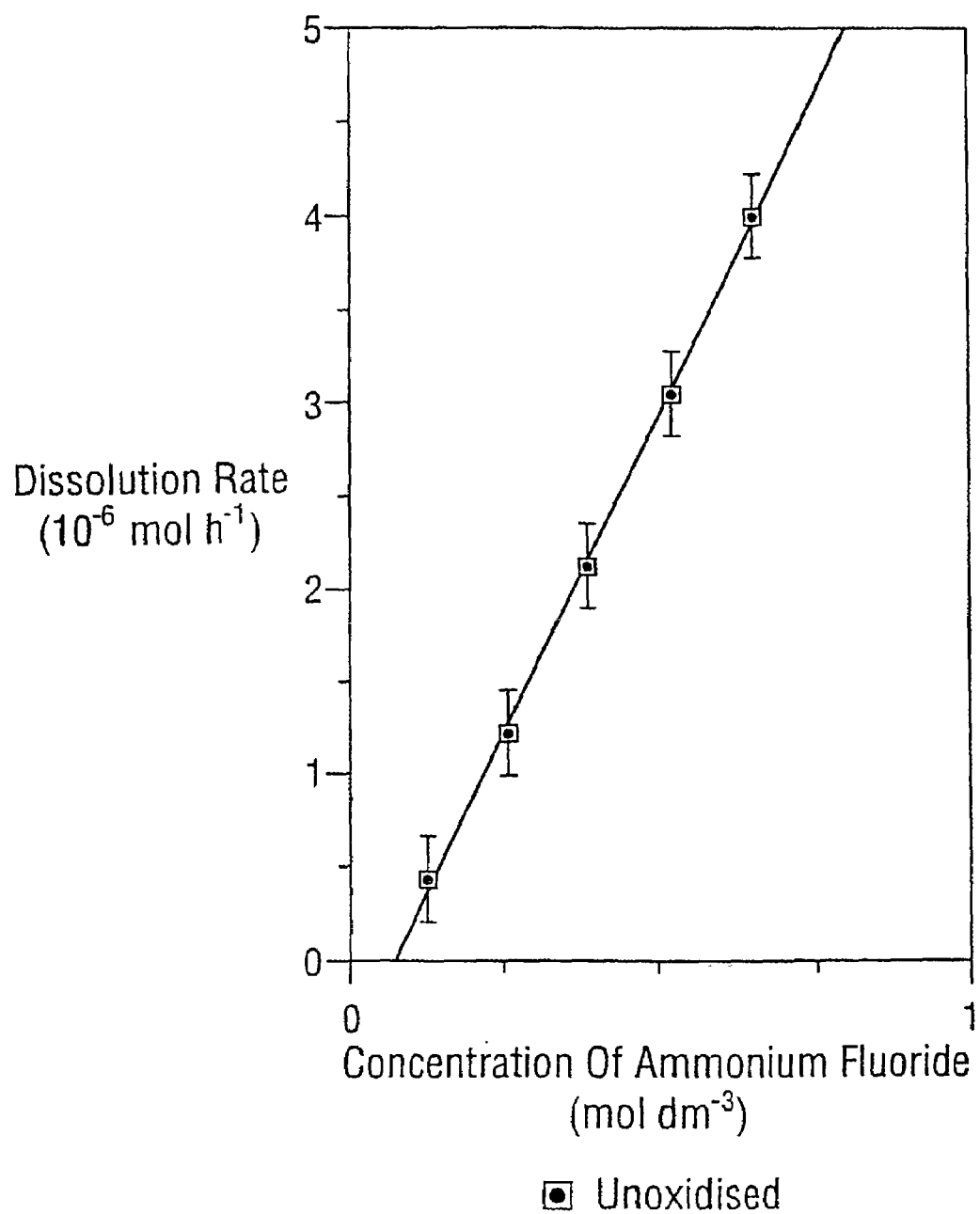
FIG. 5 shows a plot of dissolution rate vs. concentration of a ammonium fluoride.

A series of experiments on the reaction of unoxidised ZIRCALOY with varying low concentrations of $NH_4F$ in AHF were performed. The results in FIG. 5 show that the reaction is linearly dependent on the concentration of $NH_4F$. The maximum measured rate of dissolution achieved under these conditions was $4.01 \times 10^{-6}$ mol hr$^{-1}$ which corresponds to 0.04 mg hr$^{-1}$ at a concentration of 0.65 M. While this rate is slower than that observed in the reactions in the presence of fluorine, dramatic dissolution rates are observed with higher $NH_4$ concentrations, as shown by Example 5.

Example 5

High Concentrations of $NH_4F$ without $F_2$

Figure 6:
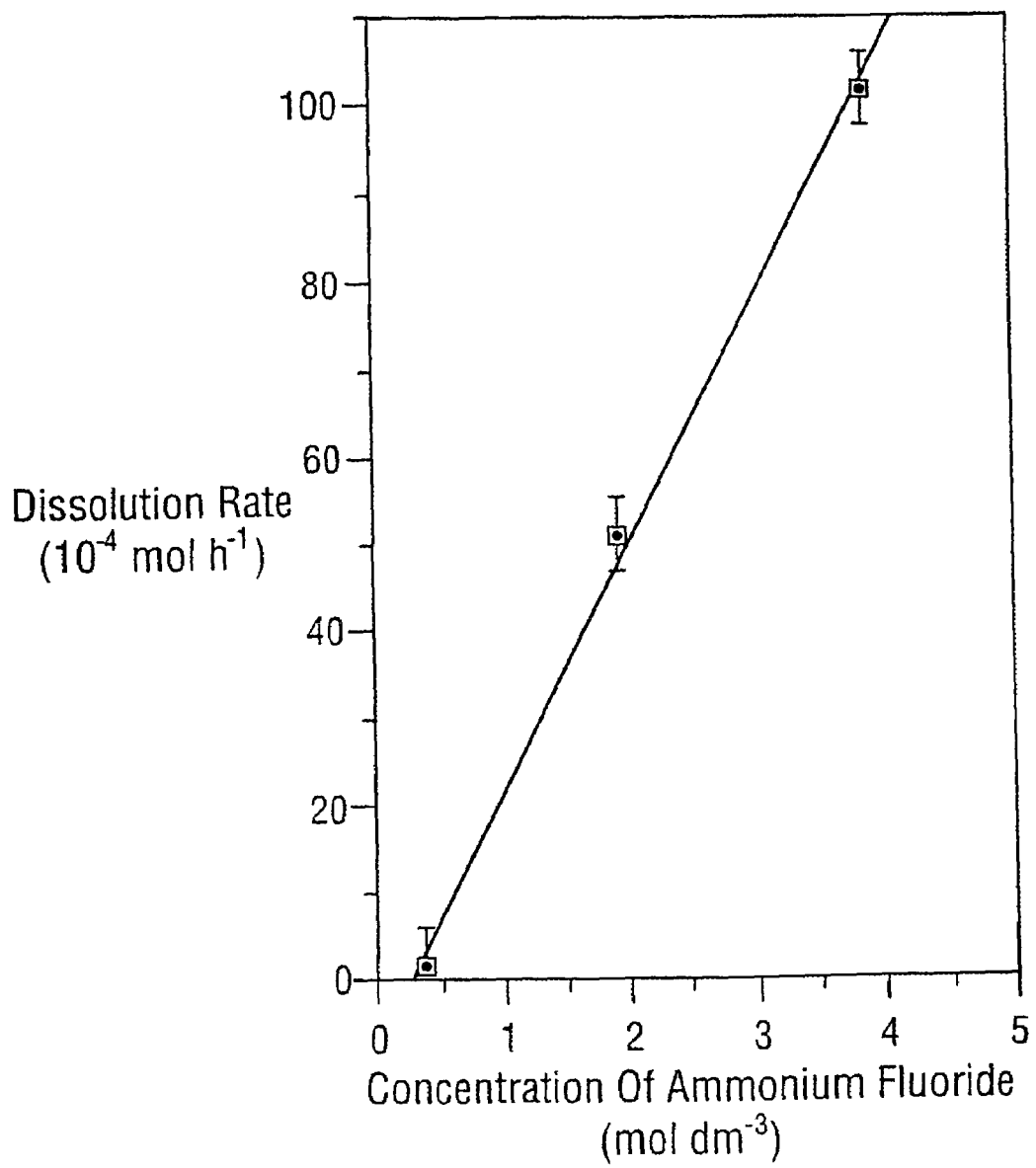
FIG. 6 shows a plot of dissolution rate vs. concentration of ammonium fluoride.

FIG. 6 shows the results from experiments performed at higher concentrations undertaken in a Monel autoclave, which demonstrates that rapid dissolution is possible. The maximum measured rate of dissolution achieved was $1.05 \times 10^{-2}$ mol hr$^{-1}$ which corresponds to 0.283 g hr$^{-1}$ at an ammonium fluoride concentration of 3.85 M.

Example 6

Figure 7:
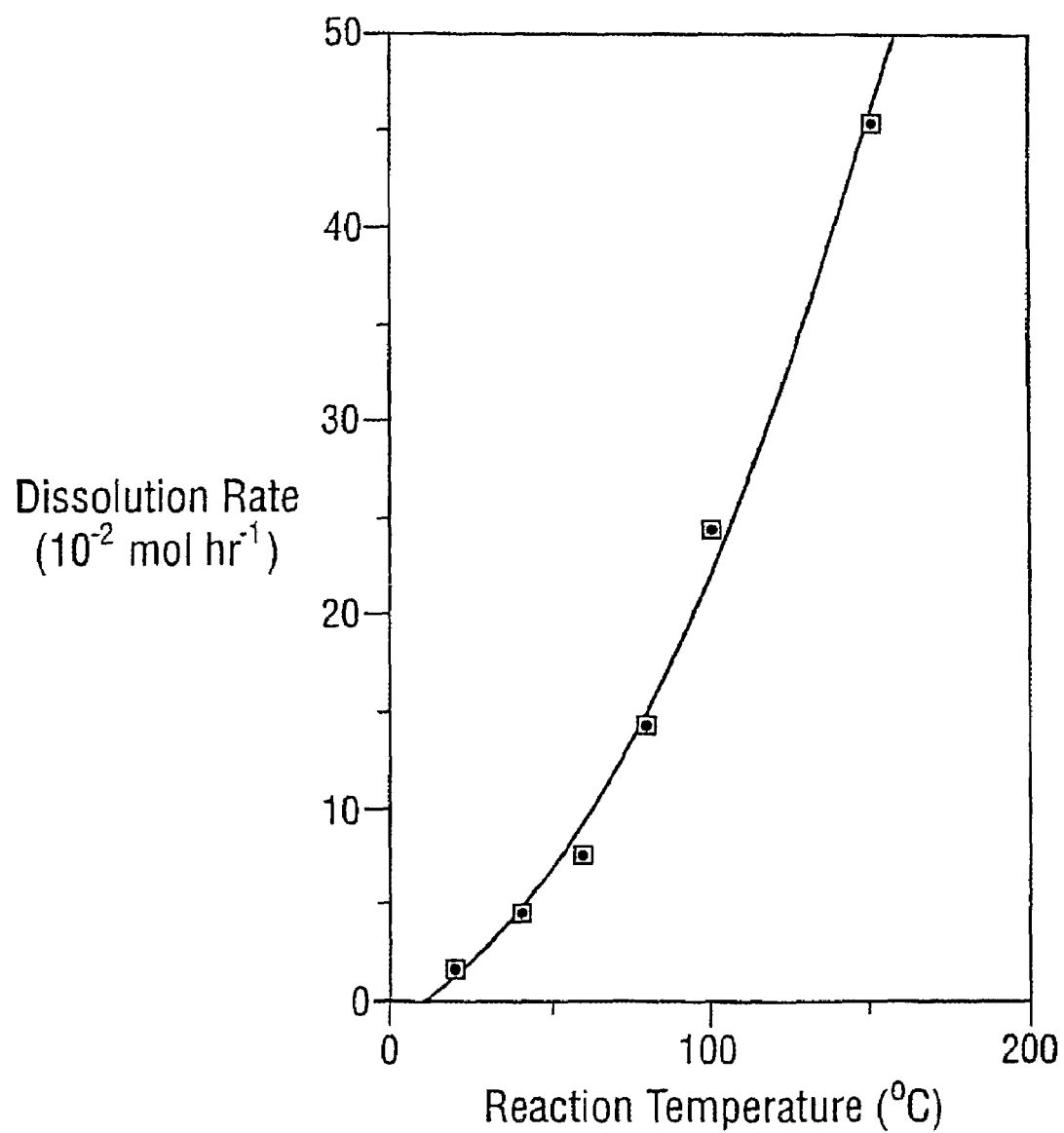
FIG. 7 shows a plot of dissolution rate vs. reaction temperature.

The effect of temperature on the dissolution rate of unoxidised ZIRCALOY was investigated by reacting the ZIRCALOY with the maximum concentration of $NH_4F$ at various temperatures. No fluorine was used. The results are shown in FIG. 7 and indicate that the process is more efficient the higher the temperature used.

The foregoing examples clearly illustrate that the present invention is efficient in breaking down both irradiated nuclear fuel and ZIRCALOY fuel cladding. Therefore, it can be seen that the present invention provides a method of reprocessing in which (1) the fuel cladding and any stainless steel assembly components may be dissolved together in a simple step, (2) the $NH_4F$/HF solution may be recycled and (3) the uranium may be separated by a simple fluorination step, all of which are advantages over the known Purex process.

What is claimed is:

1. A method of separating uranium from at least fission products in irradiated nuclear fuel, said method comprising: reacting said irradiated nuclear fuel with a solution of ammonium fluoride in hydrogen fluoride; fluorinating said reacted irradiated nuclear fuel to form a volatile uranium fluoride compound; and separating said volatile uranium fluoride compound from involatile fission products.

2. A method according to claim 1 wherein said reacted irradiated nuclear fuel is separated from the solution prior to the step of fluorinating said reacted irradiated nuclear fuel.

3. A method according to claim 2 wherein said reacted irradiated nuclear fuel is separated from the solution by either evaporating or filtering the solution.

4. A method according to claim 1 wherein there is elemental fluorine present in the solution when reacting said irradiated nuclear fuel.

5. A method according to claim 1 wherein the ammonium fluoride is present in the solution at a saturated concentration.

6. A method according to claim 1 further comprising reacting zirconium-tin alloy fuel cladding and/or stainless fuel assembly components together with said irradiated nuclear fuel.

7. A method according to claim 1 wherein the fluorinating step comprises reacting said reacted irradiated nuclear fuel with fluorine gas to form $UF_6$ as said volatile uranium fluoride compound.

8. A method according to claim 1 wherein said solution of ammonium fluoride in hydrogen fluoride is in the form of molten $NH_4F.HF$.

* * * * *